United States Patent Office 2,713,052
Patented July 12, 1955

2,713,052

PYRIDINE DERIVATIVES

Herman Herbert Fox, Passaic, N. J., assignor to Hoffmann-La Roche Inc., Nutley, N. J., a corporation of New Jersey No Drawing. Original application March 7, 1952, Serial No. 275,250. Divided and this application August 7, 1953, Serial No. 373,047

3 Claims. (Cl. 260—295)

This application relates to novel compounds which are antitubercular agents. The invention embraces the compounds in the form of their free bases as well as acid addition salts thereof.

The compounds are:
N,N'-(1,4 - dimethyltetramethylenidene)bis(isonicotinylhydrazine)
N,N'-(dimethylenidene)bis(isonicotinylhydrazine)
N,N' - (1,2 - dimethyldimethylenidene)bis(isonicotinylhydrazine)

These can be represented, respectively, by the following formulae:

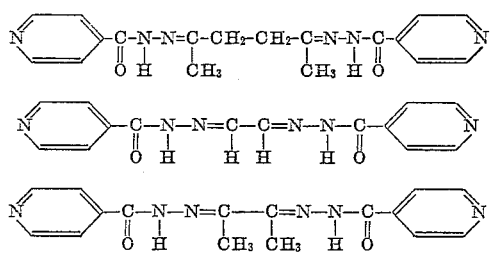

The preparation of the compounds is illustrated by the following examples. Where the compounds are obtained in the form of the free bases, the latter can be readily converted to the acid addition salts on treatment with acids, e. g., hydrochloric acid, hydrobromic acid, nitric acid, sulfuric acid, phosphoric acid, ethane sulfonic acid, tartaric acid, and the like. Where the compounds are isolated in the form of acid addition salts, the latter can be converted to the free bases by treatment with an alkali, for example, sodium hydroxide or ammonium hydroxide. It is to be understood that the claims are to be construed as also embracing salts of the bases.

Example 1

To a hot solution of 54.8 grams of isonicotinylhydrazine in about 600 cc. of methanol were added 30 cc. of acetonylacetone. Heating was continued for about 15 minutes whereupon a solid formed. The N,N'-(1,4-dimethyltetramethylenidene)bis(isonicotinylhydrazine thus obtained was filtered off and washed with hot methanol. The compound was obtained in the form of white microcrystals, melting at 165.5–167.5° C.

Example 2

To a suspension of 27.4 grams of isonicotinylhydrazine in 300 cc of hot isopropanol were added 40 cc. of aqueous glyoxal hydrate (about 30 per cent solution). The mixture was heated on a steam-bath for about 20 minutes, during which time partial solution took place, followed by precipitation of N,N'-ethylenidene-bis(isonicotinylhydrazine), which may alternatively be designated N.N'-(dimethylenidene)bis(isonicotinylhydrazine). The product was obtained in the form of white microcrystals which do not melt under 320° C.

Example 3

A mixture of 27.4 grams of isonicotinylhydrazine and 8.6 grams of diacetyl in 250 cc. of isopropanol was refluxed until solution was complete. To the refluxing solution was then added 1 cc. of 3 N hydrochloric acid whereupon a precipitate began to form. The mixture was cooled, neutralized with 1 cc. of 3 N ammonium hydroxide and the product was filtered off and washed with hot methanol. The pure N,N'-(1,2-dimethylethylenidene)bis(isonicotinylhydrazine) was obtained in the form of white crystals which melt at 280.5–281.5° C. The compound can be alternatively designated as N,N' - (1,2 - dimethyldimethylenidene)bis(isonicotinylhydrazine).

This application is a division of my copending application Serial No. 275,250, filed March 7, 1952.

I claim:
1. N,N' - (1,4 - dimethyltetramethylenidene)bis(isonicotinylhydrazine).
2. N,N' - (dimethylenidene)bis(isonicotinylhydrazine).
3. N,N' - (1,2 - dimethyldimethylenidene)bis(isonicotinylhydrazine).

No references cited.